(12) United States Patent
Edwards et al.

(10) Patent No.: US 11,551,185 B2
(45) Date of Patent: Jan. 10, 2023

(54) AUTOMATED FOOD SELECTION USING HYPERSPECTRAL SENSING

(71) Applicant: Walmart Apollo, LLC, Bentonville, AR (US)

(72) Inventors: James Benjamin Edwards, Fayetteville, AR (US); Brian C. Roth, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/363,404

(22) Filed: Jun. 30, 2021

(65) Prior Publication Data

US 2022/0058571 A1 Feb. 24, 2022

Related U.S. Application Data

(60) Provisional application No. 63/067,724, filed on Aug. 19, 2020.

(51) Int. Cl.
*G06Q 10/08* (2012.01)

(52) U.S. Cl.
CPC ................................ *G06Q 10/087* (2013.01)

(58) Field of Classification Search
CPC ...................................................... G06Q 10/87
See application file for complete search history.

(56) References Cited

U.S. PATENT DOCUMENTS

| | | | |
|---|---|---|---|
| 6,910,697 B2 | 6/2005 | Varatharajah et al. | |
| 9,014,434 B2 | 4/2015 | Bajema et al. | |
| 9,120,622 B1* | 9/2015 | Elazary | B25J 9/1697 |
| 9,463,927 B1* | 10/2016 | Theobald | B65G 1/1373 |
| 10,558,944 B1* | 2/2020 | Elazary | G06Q 10/087 |
| 2005/0126144 A1* | 6/2005 | Koselka | A01D 46/30 56/10.2 R |
| 2009/0318815 A1* | 12/2009 | Barnes | A61B 5/0079 382/128 |
| 2010/0155476 A1* | 6/2010 | Ross | H01S 1/02 235/454 |

(Continued)

OTHER PUBLICATIONS

S. Janardhana, J. Jaya, K. J. Sabareesaan and J. George, "Computer aided inspection system for food products using machine vision—A review," 2013 International Conference on Current Trends in Engineering and Technology (ICCTET), 2013, pp. 29-33, (Year: 2013).*

*Primary Examiner* — Asfand M Sheikh

(57) ABSTRACT

A solution for automated food selection includes: an order processing component operable to receive an order identifying an item; a selection component comprising: a first hyperspectral sensor operable to sense a reflection from the item and produce a sensor output based at least on the reflection; and a picking mechanism; a control component operable to: based at least on identification of the item, select a hyperspectral profile from a set of hyperspectral profiles; compare the sensor output with the selected hyperspectral profile; and based at least on the comparison, determine whether to select the item for fulfillment of the order, wherein the picking mechanism is operable to divert the item to a selection output based at least on a determination to select the item for fulfillment of the order; and a transport component operable to transport the item to an order storage zone.

20 Claims, 8 Drawing Sheets

(56) References Cited

U.S. PATENT DOCUMENTS

| | | | |
|---|---|---|---|
| 2013/0317642 A1* | 11/2013 | Asaria | G06Q 50/28 |
| | | | 700/216 |
| 2016/0334276 A1* | 11/2016 | Pluvinage | G01J 3/28 |
| 2016/0364786 A1* | 12/2016 | Wankhede | G07G 1/0036 |
| 2017/0059408 A1* | 3/2017 | Körner | G01J 3/26 |
| 2017/0100749 A1* | 4/2017 | Hartmann | B65G 47/265 |
| 2017/0274531 A1* | 9/2017 | Johnson | G06Q 10/087 |
| 2017/0278047 A1* | 9/2017 | Welty | G05D 1/0011 |
| 2018/0043533 A1* | 2/2018 | Johnson | G06Q 10/087 |
| 2018/0134492 A1* | 5/2018 | Lert, Jr. | G06Q 20/12 |
| 2018/0189636 A1 | 7/2018 | Chapela et al. | |
| 2018/0215545 A1* | 8/2018 | High | G05D 1/0261 |
| 2018/0365822 A1* | 12/2018 | Nipe | G06V 10/40 |
| 2019/0152634 A1* | 5/2019 | Almogy | B65B 5/108 |
| 2019/0276176 A1 | 9/2019 | Almogy et al. | |
| 2020/0030967 A1* | 1/2020 | Goodwin, III | B65G 1/0492 |
| 2020/0202091 A1 | 6/2020 | Wilfred et al. | |
| 2020/0278667 A1* | 9/2020 | Voorhies | G06Q 10/087 |
| 2020/0279383 A1* | 9/2020 | Kurtoglu | G01N 21/88 |
| 2020/0334628 A1* | 10/2020 | Goldberg | G06Q 30/0633 |
| 2021/0339897 A1* | 11/2021 | Almogy | B65B 5/101 |

* cited by examiner

Note: Elements 500a and 520 are not to relative scale

AUTOMATED FOOD SELECTION USING HYPERSPECTRAL SENSING

BACKGROUND

Selecting perishable food items, such as produce, for customer order fulfillment typically requires human labor. This is because, even if the perishable food items had passed inspection upon arrival at the order-fulfilling facility (such as a retail facility that delivers or provides curbside pick-up), the condition of the perishable food items may change between arrival and ultimate delivery to a customer. Although the perishable food items may have been fresh or even in a pre-ripe state, multiple factors, including time and environmental conditions (temperature and humidity), may impact the rate of spoilage while stored in inventory locations or a staging location for customer pick-up. Humans that are trained to properly ascertain the state of perishable food items are thus used to pick specific ones of the perishable food items for order fulfillment. Any limitations on the human workforce, such as training, illness, and other scheduling issues may then negatively impact order fulfillment capacity.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

A solution for automated food selection includes: an order processing component operable to receive an order identifying an item; a selection component comprising: a first hyperspectral sensor operable to sense a reflection from the item and produce a sensor output based at least on the reflection; and a picking mechanism; a control component operable to: receive the order from the order processing component; receive the sensor output from the selection component; based at least on identification of the item, select a hyperspectral profile from a set of hyperspectral profiles; compare the sensor output with the selected hyperspectral profile; and based at least on the comparison, determine whether to select the item for fulfillment of the order, wherein the picking mechanism is operable to divert the item to a selection output based at least on a determination to select the item for fulfillment of the order; and a transport component operable to transport the item to an order storage zone.

BRIEF DESCRIPTION OF THE DRAWINGS

The disclosed examples are described in detail below with reference to the accompanying drawing figures listed below.

Figure 1:
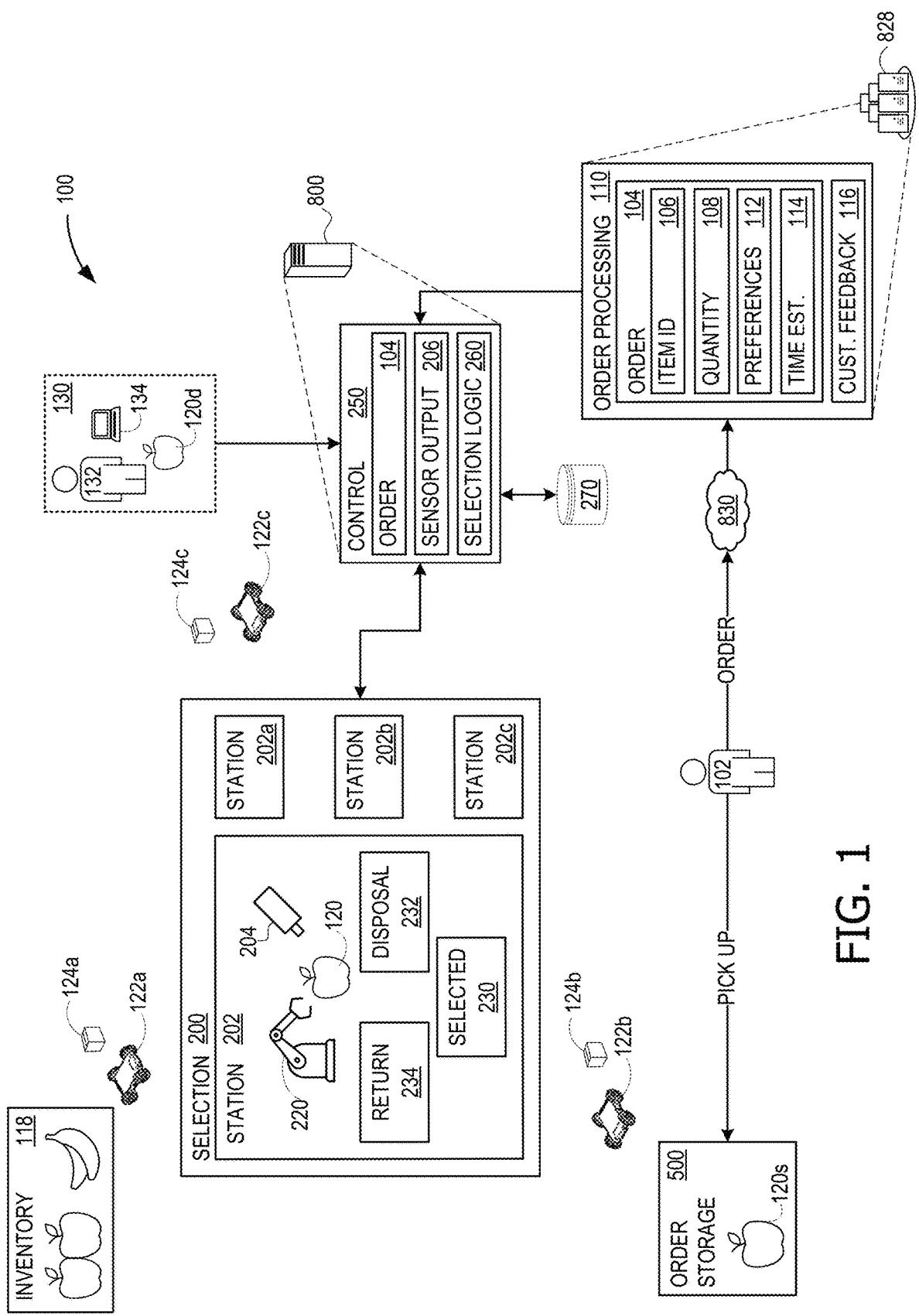
FIG. 1 illustrates an exemplary arrangement that advantageously uses hyperspectral sensing in automated food selection (e.g., selection of perishable food items for automated order fulfillment)

Corresponding reference characters indicate corresponding parts throughout the drawings. Elements in the figures are illustrated for simplicity and clarity and have not necessarily been drawn to scale. For example, the dimensions and/or relative positioning of some of the elements in the figures may be exaggerated relative to other elements to help to improve understanding. Also, common but well-understood elements that are useful or necessary in a commercially feasible embodiment may not be depicted, in order to facilitate a less obstructed view.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity, this implied leading clause is not repeated ad nauseum.

Aspects of the disclosure operate in an unconventional way to sense a hyperspectral a reflection from an item (e.g., a perishable food item), compare sensor output with a selected hyperspectral profile, and determining whether to select the item for fulfillment of an order. For example, a solution for automated food selection includes: an order processing component operable to receive an order identifying an item; a selection component comprising: a first hyperspectral sensor operable to sense a reflection from the item and produce a sensor output based at least on the reflection; and a picking mechanism; a control component operable to: receive the order from the order processing component; receive the sensor output from the selection component; based at least on identification of the item, select a hyperspectral profile from a set of hyperspectral profiles; compare the sensor output with the selected hyperspectral profile; and based at least on the comparison, determine whether to select the item for fulfillment of the order, wherein the picking mechanism is operable to divert the item to a selection output based at least on a determination to select the item for fulfillment of the order; and a transport component operable to transport the item to an order storage zone.

Aspects of the disclosure provide a technical solution that improves operational efficiency by permitting automated picking of perishable food items (e.g., produce items such as fruits and vegetables). This permits automating (at least partially) order fulfillment centers for higher operational volumes.

FIG. 1 illustrates an exemplary arrangement 100 that advantageously uses hyperspectral sensing in automated food selection (e.g., selection of perishable food items for automated order fulfillment). For example, arrangement 100 permits a customer 102 to place an order 104 for an item 120 (e.g., a perishable food item) over a network 830, and then pick up (retrieve) a suitably selected item 120s (selected version of item 120) from an order storage zone 500, which may be an automated storage and retrieval system (ASRS) 500a (described in relation to FIG. 5).

Figure 4A:
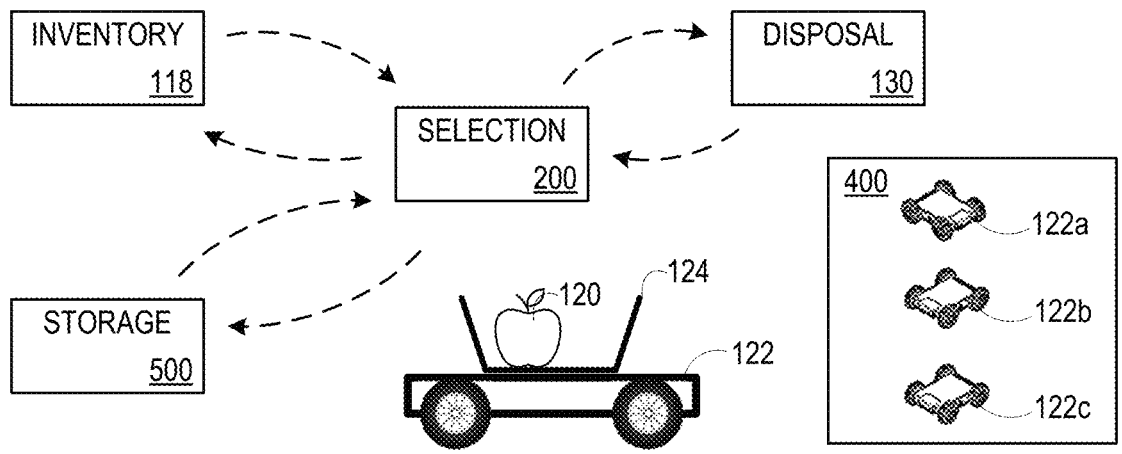
FIGS. 4A and 4B illustrate exemplary options for implementing aspects of the arrangement of FIG. 1.
Figure 4B:
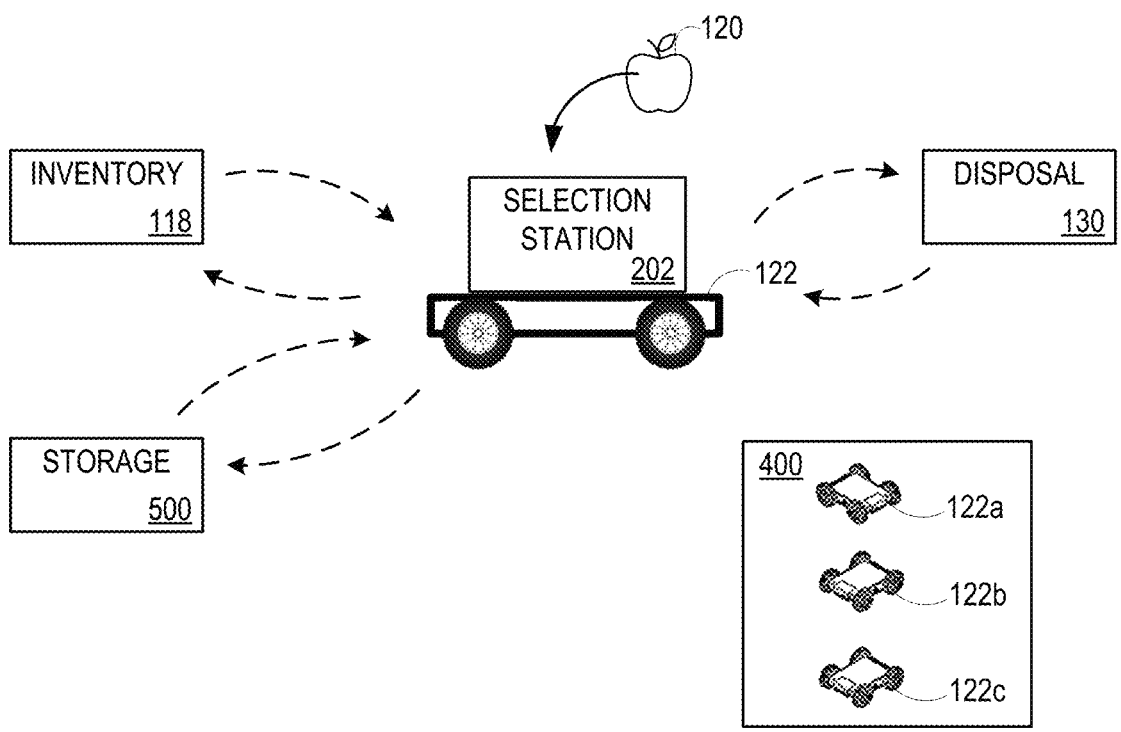
Figure 5:
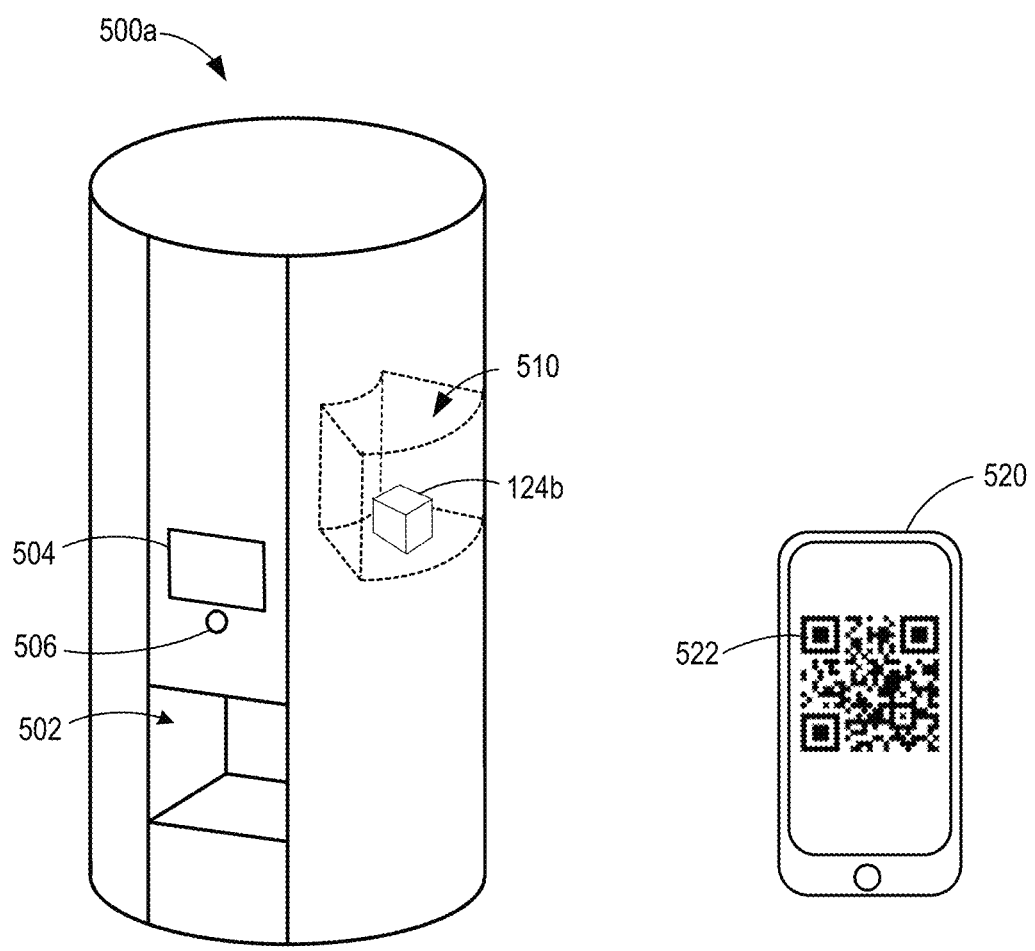
FIG. 5 illustrates an exemplary automated storage and retrieval system (ASRS) that may be used in the arrangement of FIG. 1.

Components of arrangement 100 are described individually in relation to each of FIGS. 1-5, and the interactions among the individual components are described in further detail following the description of FIG. 5. Arrangement 100 includes an order processing component 110, which receives an order 104 from a customer 102 over a network 830. In some examples, order processing component 110 is implemented on a computing node 800 or a cloud resource 828. Network 830, computing node 800, and cloud resource 828 are described in further detail in relation to FIG. 8.

Order 104 may include an item identification 106 that specifies item 120 (e.g., banana, apple, strawberry, etc.) and a quantity value 108 that specifies the count of items 120 desired. Order 104 may also include preferences such as a ripeness specification (e.g., rime now or ripe in two days), and a time estimate 114 of when customer 102 expects to retrieve item 120. In some examples, if hyperspectral sensing permits an estimate of how long item 120 has remaining prior to perishing, time estimate 114 may be used to select or reject a candidate item 120. At a later time, after retrieving item 120s from order storage zone 500, customer 102 may provide customer feedback 116, identifying whether item 120 met expectations or had already perished. In some examples, customer feedback 116 may be used to update selection criteria for arrangement 100.

Order processing component 110 forwards order 104 to a control component 250, which may also be implemented as a computing node 800 or a cloud resource 828. Control component 250 also receives sensor output 206, which includes hyperspectral sensing of item 120, and uses a selection logic 260 to determine whether to select item 120 to fulfil order 104, or to reject item 120. Control component 250 leverages a data store 270 to support selection logic 260. Control component 250 is described in further detail in relation to FIG. 2B, and data store 270 is described in further detail in relation to FIG. 2C.

The action of selecting item 120 for order 104 or rejecting (not selecting) item 120 is performed by a selection component 200. Item 120 is transported among selection component 200, an inventory zone 118, which holds inventory of items 120 and other items that may be processed for selection or rejection by selection component 200, order storage zone 500, and a disposal zone 130. Transportation is provided by a transport component 400, which is illustrated in FIG. 4, and includes a transport vehicle 122a, a transport vehicle 122b, and a transport vehicle 122c. In some examples, inventory zone 118, selection component 200, order storage zone 500, and disposal zone 130 are in fixed locations, and transport vehicles 122a-122c move item 120. In some examples, one or more of inventory zone 118, selection component 200, order storage zone 500, and disposal zone 130 are immediately adjacent, so item 120 is moved via robot arms or conveyor belts rather than vehicles. In some examples, one or more of inventory zone 118, selection component 200, order storage zone 500, and disposal zone 130 is mobile and when item 120 is moved, it is moved within a mobile one of inventory zone 118, selection component 200, order storage zone 500, or disposal zone 130.

In some examples, item 120 is moved in container 124a, container 124b, or container 124c. For example, container 124a may be an inventory tote, used for ferrying inventory to and from shelves in inventory zone 118. Container 124b may be a customer order tote, used for ferrying item 120 to order storage zone 500. Container 124c may be a disposal tote, used for ferrying potentially spoiled produce to disposal zone 130.

In some examples, selection component 200 includes a plurality of selection stations, for example, selection station 202, selection station 202a, selection station 202b, and selection station 202c. As illustrated, selection station 202 includes a hyperspectral sensor 204 (which provides at least a portion of sensor output 206), a picking mechanism 220. Picking mechanism 220 moves (diverts) item 120 to one of a selection output 230, a disposal output 232, and an inventory return output 234. If item 120 is diverted to selection output 230, item 120 will be transported to order storage zone 500. If item 120 is diverted to disposal output 232, item 120 will be transported to disposal zone 130. If item 120 is diverted to inventory return output 234, item 120 will be transported back to inventory zone 118. In some examples, selection stations 202a are similarly equipped. Selection component 200 is described in further detail in relation to FIG. 2A.

A human inspector 132, or a more finely-trained automatic inspection solution, performs a detailed inspection of item 120d, which is a version of item 120 that has been sent to disposal zone 130. Human inspector 132 makes a disposition determination for item 120d, such as donate, offer for reduced price, or throw into the trash. Human inspector 132 also provides feedback using terminal 134, for example whether the determination made by control component 250 was correct. Control component 250 is then able to use this feedback to improve the quality of future determinations regarding ripeness and suitability for sale of perishable food items.

Figure 2A:
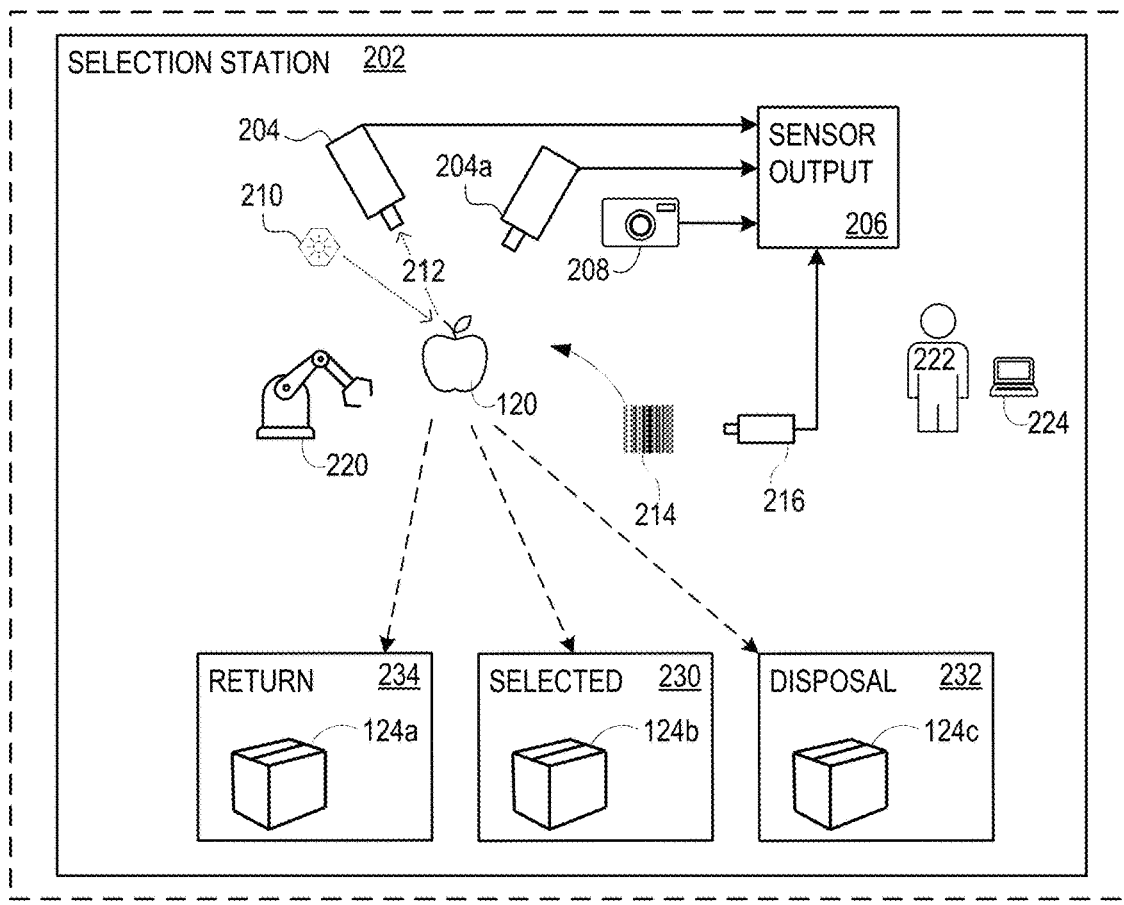
FIGS. 2A, 2B, and 2C show further detail for components of the arrangement of FIG. 1.

FIG. 2A shows further detail for selection component 200. Selection station 202, of selection component 200. As illustrated, selection station 202 includes two hyperspectral sensors 204 and 204a, although, in some examples, a different number are used. Hyperspectral sensors 204 and 204a provide at least a portion of sensor output 206. An optical camera 208 also provides a portion of sensor output 206. Some examples use a light source 210 that provides a calibrated spectrum so that a reflection 212 from item 120 has the proper spectral properties in order to make a proper determination of whether to select item 120. That is, in some examples, light source 210 and hyperspectral sensor 204 are calibrated (one or the other, or both) to produce a predetermined sensor output for a calibration standard. In this way, sensor output 206 will have the proper spectral properties when compared with known ripeness conditions. Hyperspectral sensor 204a and optical camera 208 may be similarly calibrated with light source 210 or another light source.

In some examples, a barcode 214 accompanies item 120, either affixed to item 120 or a container holding item 120. A barcode reader 216 reads barcode 214 to identify item 120. The data read from barcode 214 may be added to sensor output 206 for forwarding to control component 250. Picking mechanism 220 moves item 120 to one of selection output 230, disposal output 232, and inventory return output 234, and may place item 120 into one of containers 124a, 124b, or 124c. In some examples, a human operator 222 actually performs the picking, receiving instructions from control component 250 over a terminal 224.

Figure 2B:
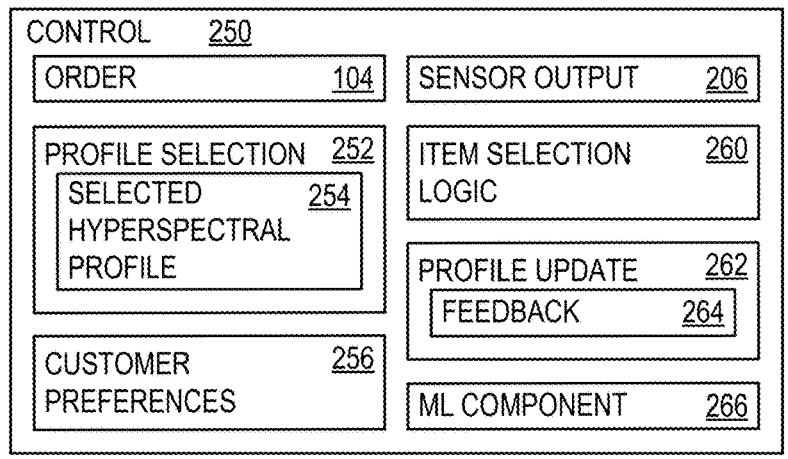

FIG. 2B shows further detail for control component 250. Control component 250 has a profile selection component 252 that selects a hyperspectral profile to be selected hyperspectral profile 254, which is used for making the determination of whether to select item 120 to fulfil order 104. Further detail on hyperspectral profiles is provided in relation to FIG. 3. Selected hyperspectral profile 254 is chosen (selected) based on information within order 104, for example item type (apple, banana, strawberry, or other) and ripeness preference which is indicated in customer preferences 256. Selection logic 260 uses selected hyperspectral profile 254 along with sensor output 206 to make the determination. Control component 250 may also have a profile update component 262 that uses feedback 264 to improve predetermined hyperspectral profiles stored in a set of hyperspectral profiles 274 (shown in FIG. 2C). Any of profile selection component 252, selection logic 260, and profile update component 262 may use or include at least a portion of a machine learning (ML) component 266. As used herein ML includes both ML and artificial intelligence (AI).

Figure 2C:
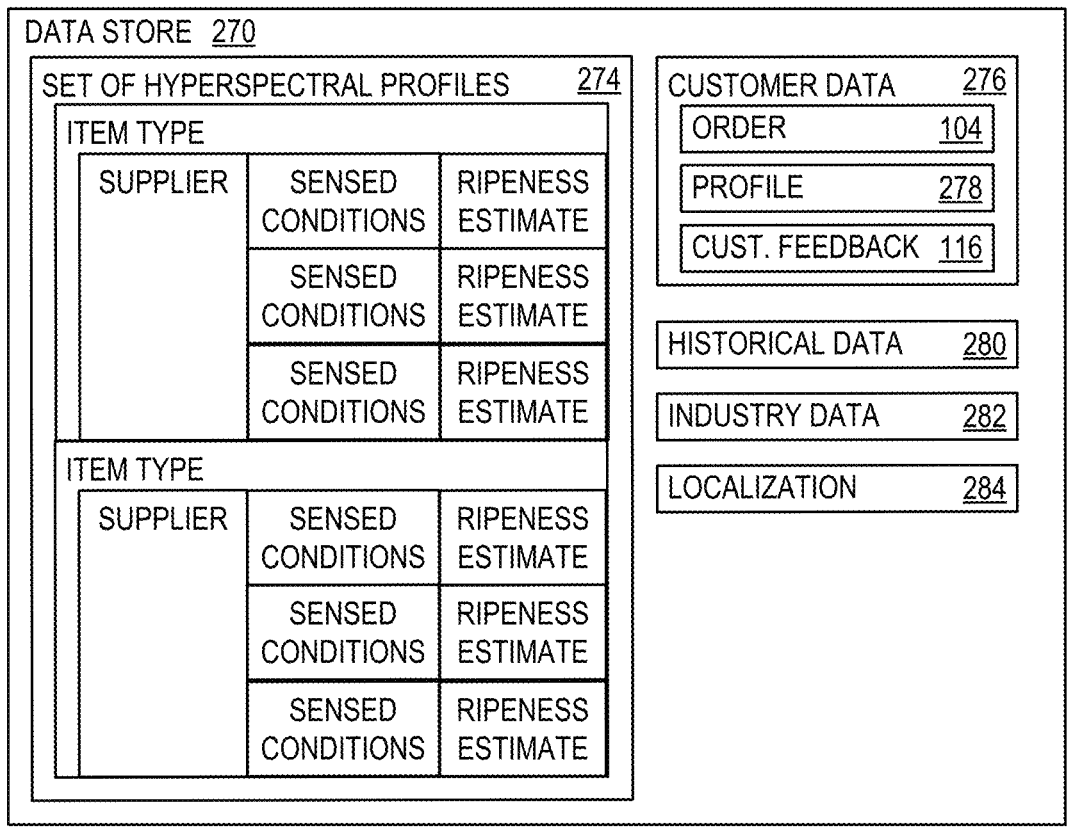

FIG. 2C shows further detail for data store 270. Data store 270 includes set of hyperspectral profiles 274 that may be indexed based on item type, supplier, sensed conditions (see FIG. 3) and ripeness estimates. In some examples, ripeness estimates include not yet ripe, ripe, and expired (perished). In some examples, ripeness estimates include the number of days until expiration. As illustrated, data store 270 also includes customer data 276, which includes order 104, a customer profile 278, and customer feedback 116. In some examples, customer profile 278 includes order histories and customer preferences that indicate whether the customer has a preference for items from a specific supplier or the average delay between placing an order an retrieving it (which may be used to set time estimate 114 of FIG. 1). In some examples, data store 270 also includes historical data 280 of prior item selections and feedback, industry data 282 including supplier information and food quality standards, and localization data 284 that may include the speed with which produce ripens and expires in the locality of arrangement 100. For example, certain perishable foods may expire in warmer climates during the summer than in colder climates during the winter.

Figure 3:
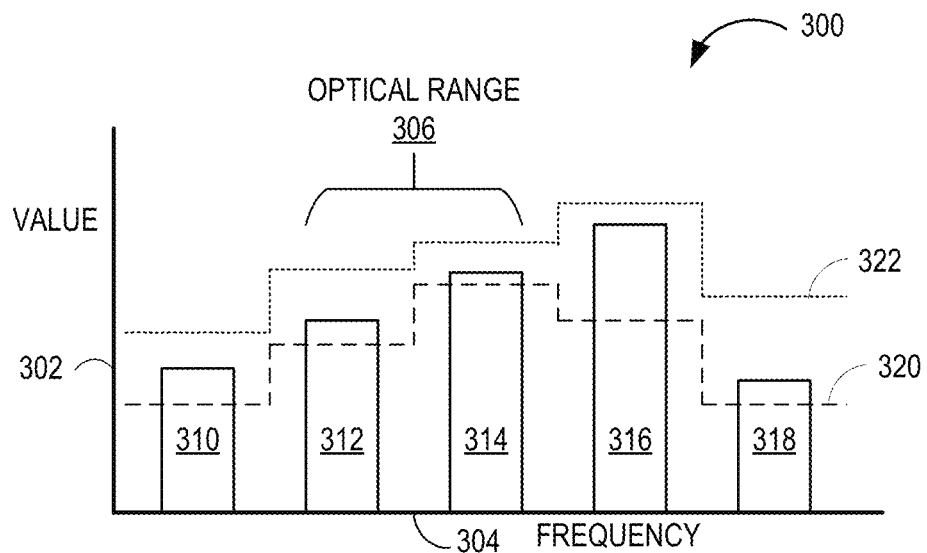
FIG. 3 illustrates notional hyperspectral selection criteria for use in the arrangement of FIG. 1.

FIG. 3 illustrates a notional hyperspectral plot 300 that forms the basis for hyperspectral selection criteria, in some examples of arrangement 100. Plot 300 shows intensity of reflection 212, against a vertical value axis 302, in various spectral bands, spread across a horizontal frequency axis 304. An optical range 306 is annotated on plot 300 to illustrate that sensed reflection 212 has hyperspectral frequency components outside of optical light frequencies. Five spectral components are illustrated, spectral component 310, spectral component 312, spectral component 314, spectral component 316, and spectral component 318, although it should be understood that a different number of spectral components (possibly hundreds or more) may be used. A lower threshold 320 and an upper threshold 322, which each varies by spectral band, are illustrated. In some examples, if each of spectral components 310-318 falls within lower threshold 320 and upper threshold 322, item 120 may be selected to fulfil order 104. In some examples, selection logic 260 uses more complex criteria, such as the value of one of spectral components 310-318 affects the range of acceptability (minimum and maximum value) for another one of spectral components 310-318.

FIG. 4A illustrates an option for implementing arrangement 100 using a stationary selection component 200. As illustrated in FIG. 4a, each of inventory zone 118, selection component 200, order storage zone 500, and disposal zone 130 are in fixed locations. Transport component 400 includes transport vehicle 122 and transport vehicles 122a-122c. Transport vehicle 122 is shown as holding item 120 in a container 124, which may be one of containers 124a-124c of FIG. 1, or a similar container. FIG. 4B illustrates another option for implementing arrangement 100 using a mobile selection component 200. In this illustrated option, selection station 202 moves around among inventory zone 118, order storage zone 500, and disposal zone 130, carrying item 120.

FIG. 5 illustrates ASRS 500a, which may be an implementation of order storage zone 500. ASRS 500a has a dispensing aperture 502, a user display screen 504, and a sensor 506, which may be a two-dimensional (2D) barcode reader. Item 120s (e.g., item 120 after being selected for order 104) is contained within container 124b in a storage location 510 (e.g., a shelf compartment) within ASRS 500a.

To retrieve item 120, customer 102 brings customer's mobile device 520, showing a 2D barcode 522 to be read by sensor 506. Optionally, user display screen 504 is a touchscreen and customer 102 requests item 120a via interaction with user display screen 504. ASRS 500a repositions container 124b to dispensing aperture 502, where customer 102 is able to pick it up. Note that FIG. 5 does not show ASRS 500a and mobile device 520 at proper relative scale. ASRS 500a is larger than mobile device 520, with a height and width on the order of multiple meters.

Thus, with reference to FIGS. 1-5, arrangement 100 comprises order processing component 110 that is operable to receive order 104 identifying item 120. In some examples, item 120 comprises a perishable food item. In some examples, item 120 is identifiable (to selection component 200) by barcode 214. In some examples, order processing component 110 is further operable to identify a ripeness preference (e.g., from customer preferences 256 in order 104 and/or customer profile 278). Arrangement 100 further comprises selection component 200 comprising first hyperspectral sensor 204 that is operable to sense reflection 212 from item 120 and produce sensor output 206 based at least on reflection 212. Arrangement 100 further comprises picking mechanism 220, which is operable to divert item 120 to a selection output 230 based at least on a determination to select item 120 for fulfillment of order 104.

In some examples, selection component 200 further comprises light source 210 positioned to produce reflection 212 from item 120. In some examples, light source 210 and first hyperspectral sensor 204 are calibrated to produce a predetermined sensor output for a calibration standard. In some examples, selection component 200 further comprises at least one additional sensor operable to contribute additional sensor data to the sensor output. The additional sensor is selected from the list consisting of: second hyperspectral sensor 204a positioned at a different viewing angle than first hyperspectral sensor 204 relative to item 120, and optical camera 208. The additional sensor(s) contribute additional sensor data to sensor output 206. In some examples, selection component 200 further comprises barcode reader 216, which is operable to identify item 120.

Picking mechanism 220 is further operable to divert item 120 to disposal output 232 based at least on a determination to not select item 120 for fulfillment of order 104, for example if control component 250 determines that item 120 may have passed its expiration. Picking mechanism 220 is further operable to divert item 120 to inventory return output 234, for example if control component 250 determines that item 120 has not yet passed its expiration (and thus is still viable), but it exceeds the quantity identified in quantity value 108 of order 104. In some examples, selection component 200 is stationary, and in some examples, selection component 200 is mobile. In some examples, selection component 200 comprises a plurality of selection stations (e.g., selection stations 202, 202a, 202b, and 202c) and each selection station comprises a hyperspectral sensor (e.g., hyperspectral sensor 204). Arrangement 100 further comprises disposal zone 130.

Arrangement 100 further comprises control component 250, which is operable to receive order 104 from order processing component 110 and receive sensor output 206 from selection component 200. Control component 250 is also operable to, based at least on identification of item 120, select a hyperspectral profile (e.g., selected hyperspectral profile 254) from set of hyperspectral profiles 274. Control component 250 is also operable to compare sensor output 206 with selected hyperspectral profile 254 and, based at least on the comparison, determine whether to select item 120 for fulfillment of order 104. In some examples, control component 250 is further operable to select the hyperspectral profile based at least on a ripeness preference, which may be specified in order 104 and/or customer profile 278. In some examples, control component 250 is further operable to select the hyperspectral profile based at least on an expected storage duration in order storage zone 500, for example as indicated in time estimate 114. In some examples, control component 250 is co-located with selection component 200.

In some examples, hyperspectral profile update component 262 is operable to update set of hyperspectral profiles 274 based at least on received feedback 264 or environmental conditions (e.g., in historical data 280 and/or localization data 284). In some examples, received feedback 264 comprises customer feedback 116. In some examples, received feedback 264 comprises feedback from an inspection process at disposal zone 130. In some examples, hyperspectral profile update component 262 comprises ML component 266.

Arrangement 100 further comprises transport component 400, which is operable to transport item 120 to order storage zone 500. In some examples, transport component is further operable to transport item 120 to/from inventory zone 118 to selection component 200, to transport item 120 to/from disposal zone 130, and/or to/from order storage zone 500. Control component 250 is further operable to instruct transport component 400. In some examples, order storage zone 500 comprises an ASRS 500a.

Figure 6:
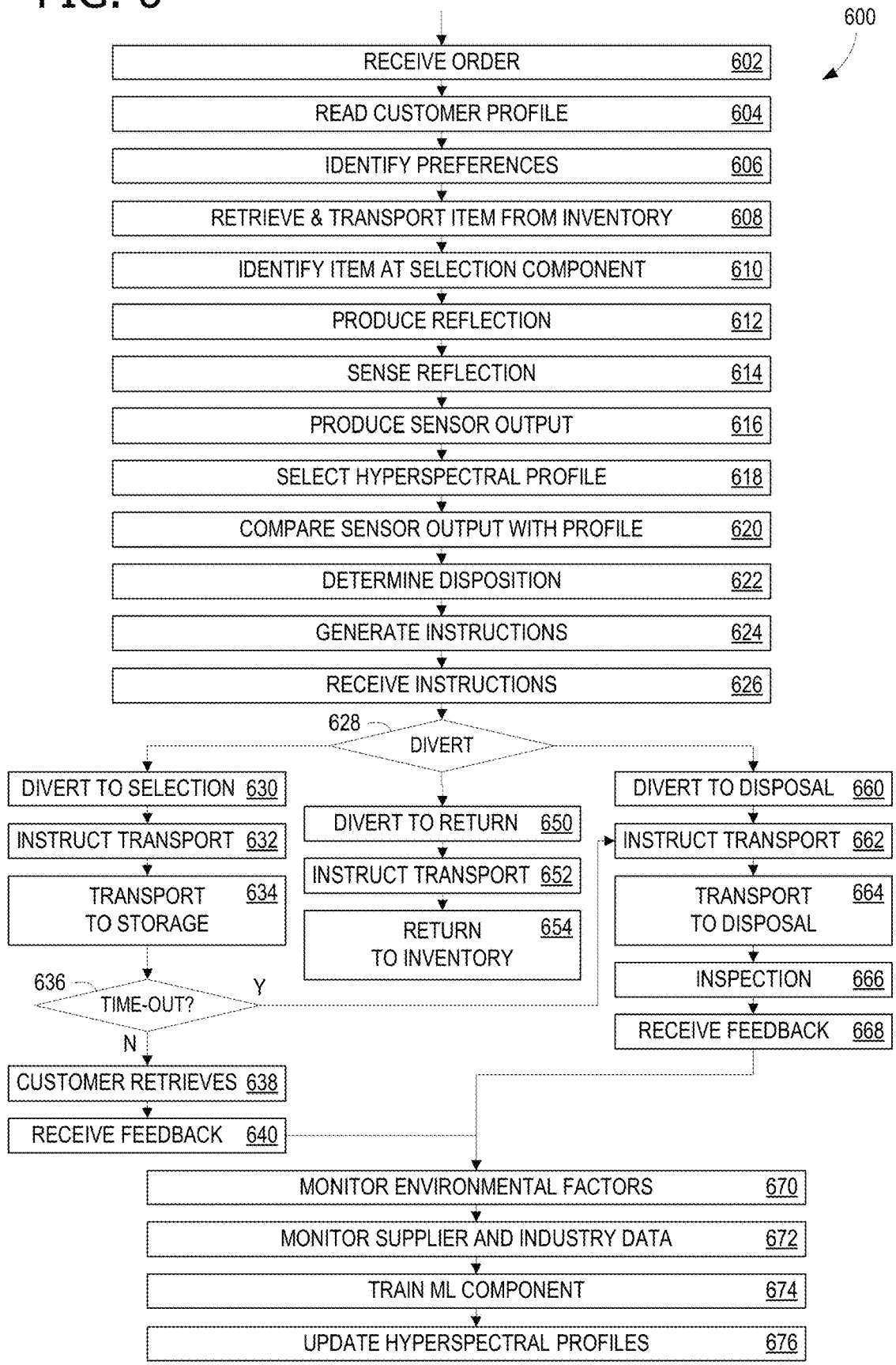
FIG. 6 shows a flow chart of exemplary operations associated with the arrangement of FIG. 1.

FIG. 6 shows a flow chart 600 of exemplary operations associated with arrangement 100 (of FIG. 1), for example, automated food selection using hyperspectral sensing. In some examples, some or all of the computer operations described for flow chart 600 are performed as computer-executable instructions on computing node 800 (see FIG. 8). Flow chart 600 commences with operation 602, which includes receiving order 104 identifying item 120. In some examples, item 120 comprises a perishable food item. Customer profile 278 is read during operation 604. Operation 606 includes identifying a ripeness preference, for example from order 104 and/or customer profile 278. Item 120 is retrieved from inventory zone 118 into selection component 200 during operation 608, for example by transporting item 120 from inventory zone 118 to selection component 200.

In some examples, item 120 is identified by barcode 214 in operation 610. Light source 210, which may be a calibrated light source, generates illumination in operation 612, thereby producing reflection 212 from item 120 with light source 210. Operation 614 includes sensing, by first hyperspectral sensor 204 of selection component 200, reflection 212 from item 120. Operation 616 includes producing, based at least on reflection 212, sensor output 206. In some examples, operation 616 further includes contributing additional sensor data to sensor output 206 by at least one additional sensor. The additional sensor is at least one of: second hyperspectral sensor 204a positioned at a different viewing angle than first hyperspectral sensor 204 relative to item 120, and optical camera 208.

Operation 618 includes, based at least on identification of item 120, selecting a hyperspectral profile (e.g., selected hyperspectral profile 254) from set of hyperspectral profiles 274. In some examples, selecting the hyperspectral profile comprises selecting the hyperspectral profile based at least on the ripeness preference. In some examples the hyperspectral profile is selected based at least on an expected storage duration in order storage zone 500. Operation 620 includes comparing sensor output 206 with selected hyperspectral profile 254. In some examples, the result of this comparison returns an expected expiration date (when item 120 has perished, or is below a quality threshold). Operation 622 includes, based at least on the comparison, determining whether to select item 120 for fulfillment of order 104. Operation 624 includes control component 250 generating control instructions to send to selection component 200 (e.g., whether to select item 120, return item 120 to inventory zone 118, or send item 120 to disposal zone 130).

Selection component 200 receives the determination, regarding item 120, in operation 626, and implements the three-way option indicated at 628: select for order 104, return to inventory zone 118, or send to disposal zone 130. If the determination is selection of item 120, operation 630 includes, based at least on a determination to select item 120 for fulfillment of order 104, diverting item 120 to selection output 230. Transport component 400 is instructed (for example by control component 250 or by selection component 200) to transport item 120 to order storage zone 500. Operation 634 includes the action of transporting item 120 to order storage zone 500. In some examples, order storage zone 500 comprises ASRS 500a.

While item 120 is within order storage zone 500, decision operation 363 monitors for a time-out condition, for example item 120 perishing. Such a prediction could be made using the expected expiration date was determined when sensor output 206 was compared with selected hyperspectral profile 254, in operation 620. Upon expiration, flow chart 600 moves to operation 662, described below. Otherwise, customer 102 picks up (retrieves) item 120 in operation 638. Optionally, customer 102 provides customer feedback 116 regarding whether item 120 was in the requested condition (e.g., ripe or pre-ripe), or whether item 120 had already expired. Customer feedback 116 is received in operation 640.

If the determination at 628 is to return item 120 to inventory zone 118, operation 650 includes, based at least on a determination to not select item 120 for fulfillment of order 104, diverting item 120 to inventory return output 234. Transport component 400 is instructed in operation 652, and operation 654 includes transporting item 120 from selection component 200 to inventory zone 118.

If the determination at 628 is to send item 120 to disposal zone for further inspection, operation 660 includes, based at least on a determination to not select item 120 for fulfillment of order 104, diverting item 120 to disposal output 232. Transport component 400 is instructed in operation 662, and operation 664 includes transporting item 120 from selection component 200 to disposal zone 130. An inspection process occurs at disposal zone 130 during operation 666, for example human inspector 132 determining whether item 120 (now designated item 120*d*) is still viable or needs to be immediately disposed of (e.g., donated, offered for reduced price, or thrown into the trash). This determination is indicated to control component 250 via terminal 134 as disposal feedback. Operation 668 includes control component 250 receiving disposal feedback from disposal zone 130. Received feedback 264 includes whichever of disposal feedback and customer feedback 116 that is received by control component 250.

Environmental factors, such as heat and humidity (which may affect ripening and perishing timelines), are monitored in operation 670. Supplier histories are monitored in operation 672, for example which supplier provides produce that spoils more quickly or ripens later after delivery. Such information may be stored in historical data, industry data, and/or localization data 284. This data may be used for training ML component 266, in operation 674. Operation 674 may also include training ML component 266 to better predict ripening and expiration, based on comparison of sensor output 206 with selected hyperspectral profile 254 (e.g., during operation 620). Operation 676 includes updating set of hyperspectral profiles 274 based at least on received feedback 264 or environmental conditions. That is, the data used for training ML component 266 may also be used to update set of hyperspectral profiles 274. In some examples, ML component 266 updates set of hyperspectral profiles 274, based on its new training.

Figure 7:
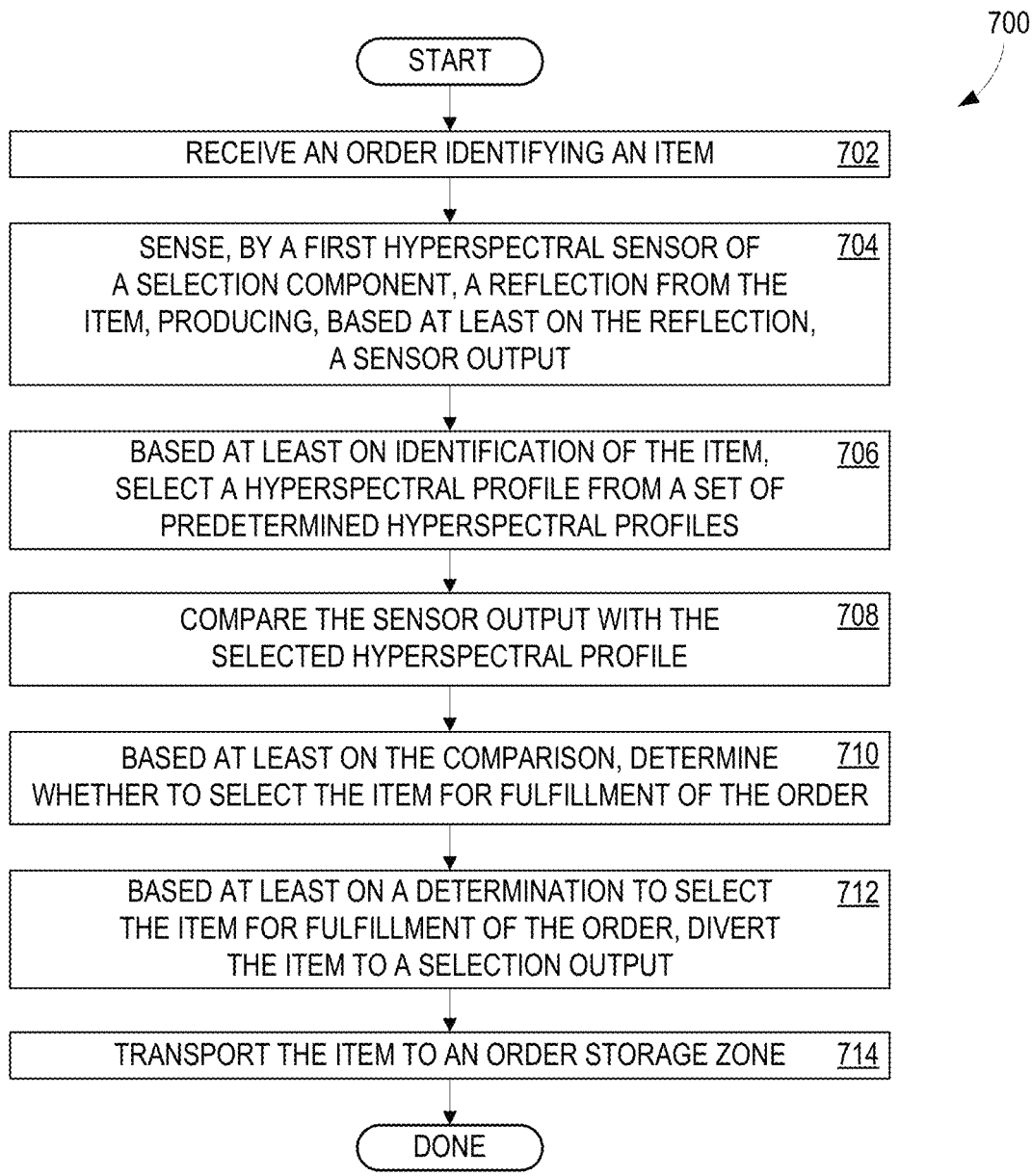
FIG. 7 shows another flow chart of exemplary operations associated with the arrangement of FIG. 1.

FIG. 7 shows a flow chart 700 of exemplary operations associated with arrangement 100 (of FIG. 1). In some examples, some or all of the computer operations described for flow chart 700 are performed as computer-executable instructions on computing node 800 (see FIG. 8). Flow chart 700 commences with operation 702, which includes receiving an order identifying an item. Operation 704 includes sensing, by a first hyperspectral sensor of a selection component, a reflection from the item, producing, based at least on the reflection, a sensor output. Operation 706 includes based at least on identification of the item, selecting a hyperspectral profile from a set of hyperspectral profiles. Operation 708 includes comparing the sensor output with the selected hyperspectral profile. Operation 710 includes based at least on the comparison, determining whether to select the item for fulfillment of the order. Operation 712 includes based at least on a determination to select the item for fulfillment of the order, diverting the item to a selection output. Operation 714 includes transporting the item to an order storage zone.

Exemplary Operating Environment

Figure 8:
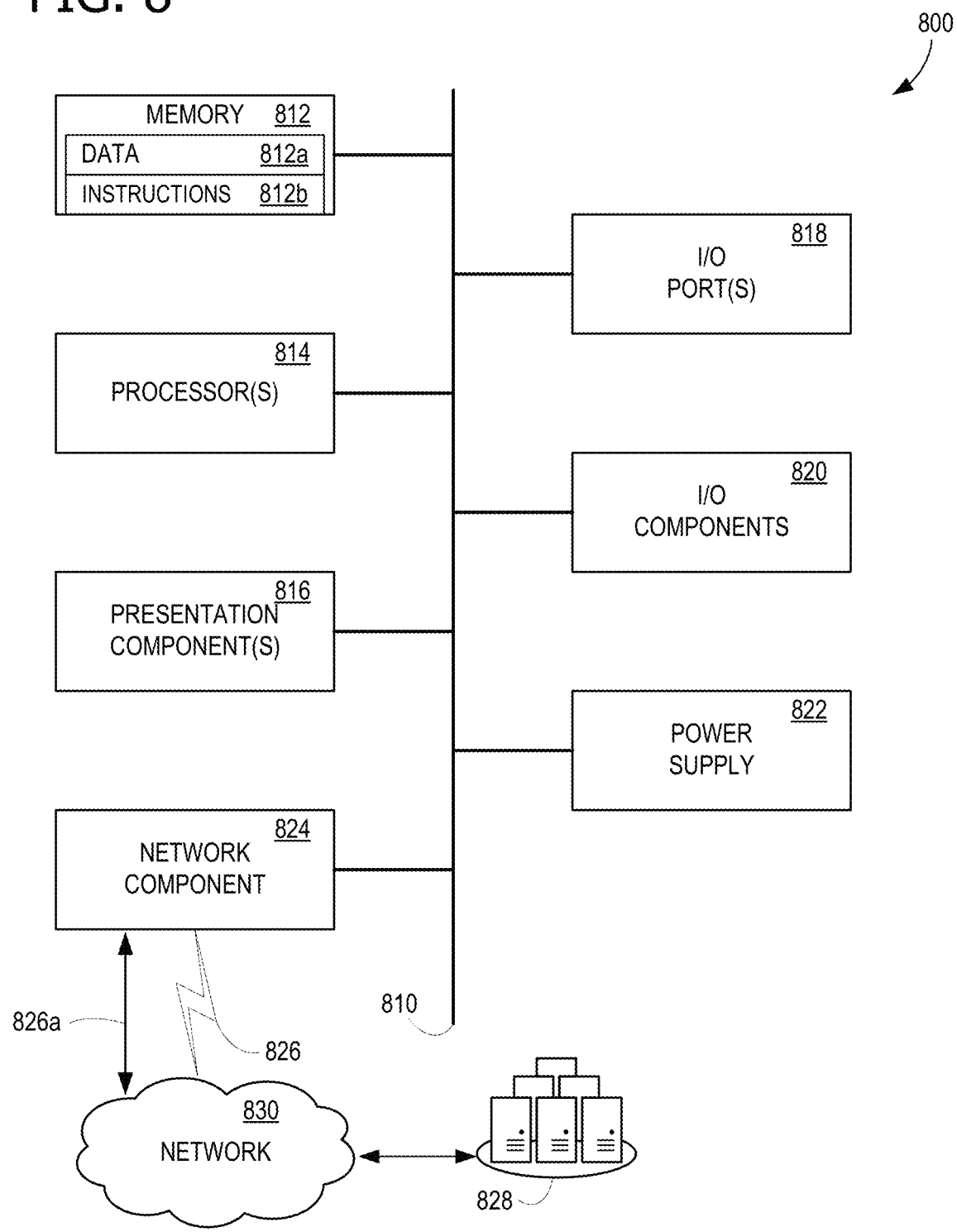
FIG. 8 is a block diagram of an example computing node for implementing aspects disclosed herein.

FIG. 8 is a block diagram of an example computing node 800 for implementing aspects disclosed herein and is designated generally as computing node 800. Computing node 800 is one example of a suitable computing environment and is not intended to suggest any limitation as to the scope of use or functionality of the invention. Neither should the computing node 800 be interpreted as having any dependency or requirement relating to any one or combination of components/modules illustrated. The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing nodes, etc. The disclosed examples may also be practiced in distributed computing environments, where tasks are performed by remote-processing devices that are linked through network 830 (e.g., a communications network).

Computing node 800 includes a bus 810 that directly or indirectly couples the following devices: memory 812, one or more processors 814, one or more presentation components 816, input/output (I/O) ports 818, I/O components 820, a power supply 822, and a network component 824. Computing node 800 should not be interpreted as having any dependency or requirement related to any single component or combination of components illustrated therein. While computing node 800 is depicted as a seemingly single device, multiple computing nodes 800 may work together and share the depicted device resources. That is, one or more computer storage devices having computer-executable instructions stored thereon may perform operations disclosed herein. For example, memory 812 may be distributed across multiple devices, processor(s) 814 may provide housed on different devices, and so on.

Bus 810 represents what may be one or more busses (such as an address bus, data bus, or a combination thereof). Although the various blocks of FIG. 8 are shown with lines for the sake of clarity, delineating various components can be accomplished with various other schemes. For example, a presentation component such as a display device can also be classified as an I/O component. Additionally, processors have internal memory. Thus, the diagram of FIG. 8 is merely illustrative of an exemplary computing node that can be used in connection with one or more embodiments. Distinction is not made between such categories as "workstation," "server," "laptop," "hand-held device," etc., as all are contemplated within the scope of FIG. 8 and the references herein to a "computing node" or a "computing device." Memory 812 may include any of the computer-readable media discussed herein. Memory 812 is used to store and access data 812*a* and instructions 812*b* operable to carry out the various operations disclosed herein. In some examples, memory 812 includes computer storage media in the form of volatile and/or nonvolatile memory, removable or non-removable memory, data disks in virtual environments, or a combination thereof.

Processor(s) 814 may include any quantity of processing units that read data from various entities, such as memory 812 or I/O components 820. Specifically, processor(s) 814 are programmed to execute computer-executable instructions for implementing aspects of the disclosure. The instructions may be performed by the processor, by multiple processors within the computing node 800, or by a processor external to the client computing node 800. In some examples, the processor(s) 814 are programmed to execute instructions such as those illustrated in the flowcharts discussed below and depicted in the accompanying drawings. Moreover, in some examples, the processor(s) 814 represent an implementation of analog techniques to perform the operations described herein. For example, the operations may be performed by an analog client computing node 800 and/or a digital client computing node 800.

Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly among multiple computing nodes 800, across a wired connection, or in other ways. Ports 818 allow computing node 800 to be logically coupled to other devices including I/O components 820, some of which may be built in. Example I/O components 820 include, for example but without limitation, a microphone, keyboard, mouse, joystick, game pad, satellite dish, scanner, printer, wireless device, etc.

In some examples, the network component 824 includes a network interface card and/or computer-executable instructions (e.g., a driver) for operating the network interface card. Communication between the computing node 800 and other devices may occur using any protocol or mechanism over any wired or wireless connection. In some examples, the network component 824 is operable to communicate data over public, private, or hybrid (public and private) network 830 using a transfer protocol, between devices wirelessly using short range communication technologies (e.g., near-field communication (NFC), Bluetooth® branded communications, or the like), or a combination thereof. Network component 824 communicates over wireless communication link 826 and/or a wired communication link 826a to a cloud resource 828 across network 830. Various different examples of communication links 826 and 826a include a wireless connection, a wired connection, and/or a dedicated link, and in some examples, at least a portion is routed through the internet.

Although described in connection with an example computing node 800, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing nodes, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose purpose computer, aspects of the disclosure transform the general-purpose computer into a special-purpose computing device or computing node when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Exemplary Operating Methods and Systems

An exemplary system for automated food selection using hyperspectral sensing comprises: an order processing component operable to receive an order identifying an item; a selection component comprising: a first hyperspectral sensor operable to sense a reflection from the item and produce a sensor output based at least on the reflection; and a picking mechanism; a control component operable to: receive the order from the order processing component; receive the sensor output from the selection component; based at least on identification of the item, select a hyperspectral profile from a set of hyperspectral profiles; compare the sensor output with the selected hyperspectral profile; and based at least on the comparison, determine whether to select the item for fulfillment of the order, wherein the picking mechanism is operable to divert the item to a selection output based at least on a determination to select the item for fulfillment of the order; and a transport component operable to transport the item to an order storage zone.

An exemplary method of automated food selection using hyperspectral sensing comprises: receiving an order identifying an item; sensing, by a first hyperspectral sensor of a selection component, a reflection from the item, producing, based at least on the reflection, a sensor output; based at least on identification of the item, selecting a hyperspectral profile from a set of hyperspectral profiles; comparing the sensor output with the selected hyperspectral profile; based at least on the comparison, determining whether to select the item for fulfillment of the order; based at least on a determination to select the item for fulfillment of the order, diverting the item to a selection output; and transporting the item to an order storage zone.

An exemplary computer storage device has computer-executable instructions stored thereon for automated food selection using hyperspectral sensing, which, on execution by a computer, cause the computer to perform operations comprising: receiving an order identifying an item, wherein the item comprises a perishable food item; receiving sensor output from a hyperspectral sensor, wherein the sensor output is based at least on a reflection from the item; based at least on identification of the item, selecting a hyperspectral profile from a set of hyperspectral profiles; comparing the sensor output with the selected hyperspectral profile; based at least on the comparison, determining whether to select the item for fulfillment of the order; based at least on a determination to select the item for fulfillment of the order, diverting the item to a selection output and controlling transport of the item to an ASRS; based at least on a determination to not select the item for fulfillment of the order, diverting the item to a disposal output and controlling transport of the item to a disposal zone; and updating the set of hyperspectral profiles based at least on received feedback or environmental conditions.

Alternatively, or in addition to the other examples described herein, examples include any combination of the following:
  the selection component further comprises a light source positioned to produce the reflection from the item;
  producing the reflection from the item with a light source;
  the selection component further comprises at least one additional sensor operable to contribute additional sensor data to the sensor output;
  contributing additional sensor data to the sensor output by at least one additional sensor;
  the additional sensor is selected from the list consisting of: a second hyperspectral sensor positioned at a different viewing angle than the first hyperspectral sensor relative to the item, and an optical camera;
  the transport component is further operable to transport the item from an inventory zone to the selection component;
  transporting the item from an inventory zone to the selection component;
  the transport component is further operable to transport the item to the disposal zone;
  the transport component is further operable to transport the selection component with the item to the order storage zone;
  the order storage zone comprises an ASRS;
  the order processing component is further operable to identify a ripeness preference;
  identifying a ripeness preference;
  the control component is further operable to select the hyperspectral profile based at least on the ripeness preference;
  selecting the hyperspectral profile comprises selecting the hyperspectral profile based at least on the ripeness preference;
  a disposal zone;
  the picking mechanism is further operable to divert the item to a disposal output based at least on a determination to not select the item for fulfillment of the order;
  based at least on a determination to not select the item for fulfillment of the order, diverting the item to a disposal output;
  a hyperspectral profile update component operable to update the set of hyperspectral profiles based at least on received feedback or environmental conditions;
  updating the set of hyperspectral profiles based at least on received feedback or environmental conditions;
  the item comprises a perishable food item;
  the selection component further comprises a barcode reader operable to identify the item;
  the item is identified by a barcode;
  the picking mechanism is further operable to divert the item to an inventory return output;
  the light source and the first hyperspectral sensor are calibrated to produce a predetermined sensor output for a calibration standard;
  the selection component is stationary;
  the selection component comprises a plurality of selection stations and each selection station comprises a hyperspectral sensor;
  the control component is further operable to instruct the transport component;
  the ripeness preference is specified in the order;
  the ripeness preference is specified in a customer profile;
  the received feedback comprises customer feedback;
  the received feedback comprises feedback from an inspection process at the disposal zone;
  the control component is further operable to select the hyperspectral profile based at least on an expected storage duration in the order storage zone;
  the control component is co-located with the selection component; and
  the hyperspectral profile update component comprises an ML component.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for automated food selection using hyperspectral sensing, the system comprising:

an order processor operable to receive an order identifying an item;
a selection component comprising:
a first hyperspectral sensor operable to sense a reflection from the item and produce a sensor output based at least on the reflection; and
a picking mechanism;
a control processor operable to:
receive the order from the order processing component;
receive the sensor output from the selection component;
based at least on identification of the item, select a hyperspectral profile from a set of hyperspectral profiles;
compare the sensor output with the selected hyperspectral profile, wherein the comparison comprises comparing the sensor output to a lower threshold and a higher threshold within the selected hyperspectral profile;
based at least on whether the sensor output is within the lower threshold and the higher threshold within the selected hyperspectral profile, determine whether to select the item for fulfillment of the order, and
control the picking mechanism to divert the item to a selection output based at least on a determination to select the item for fulfillment of the order.

2. The system of claim 1, wherein the selection component further comprises a light source positioned to produce the reflection from the item.

3. The system of claim 1, wherein the selection component further comprises at least one additional sensor operable to contribute additional sensor data to the sensor output, and wherein the additional sensor is selected from the list consisting of:
a second hyperspectral sensor positioned at a different viewing angle than the first hyperspectral sensor relative to the item, and an optical camera,
wherein the determination to select the item for fulfillment of the order is based on the respective sensor outputs of both the first hyperspectral sensor and the second hyperspectral sensor being between the lower threshold and the higher threshold within the selected hyperspectral profile.

4. The system of claim 1, further comprising:
a transport vehicle operable to transport the item to an order storage zone,
wherein the transport vehicle is further operable to transport the item from an inventory zone to the selection component.

5. The system of claim 4, wherein the transport vehicle is further operable to transport the selection component with the item to the order storage zone.

6. The system of claim 4, wherein the order storage zone comprises an automated storage and retrieval system (ASRS).

7. The system of claim 1, wherein the order processor is further operable to identify a ripeness preference and wherein the controller is further operable to select the hyperspectral profile based at least on the ripeness preference.

8. The system of claim 1, further comprising:
a disposal zone, wherein the picking mechanism further diverts the item to a disposal output based at least on a determination to not select the item for fulfillment of the order, and wherein the transport vehicle is further operable to transport the item to the disposal zone.

9. The system of claim 1, further comprising:
a hyperspectral profile update component operable to update the set of hyperspectral profiles based at least on received feedback or environmental conditions.

10. The system of claim 1, wherein the item comprises a perishable food item.

11. A method of automated food selection using hyperspectral sensing, the method comprising:
receiving, by an order processor, an order identifying an item;
sensing, by a first hyperspectral sensor of a selection component, a reflection from the item,
producing, by the first hyperspectral sensor, based at least on the reflection, a sensor output;
based at least on identification of the item, selecting, by a control processor, a hyperspectral profile from a set of hyperspectral profiles;
comparing, by the control processor, the sensor output with the selected hyperspectral profile, wherein the comparison comprises comparing the sensor output to a lower threshold and a higher threshold within the selected hyperspectral profile;
based at least on whether the sensor output is within the lower threshold and the higher threshold within the selected hyperspectral profile, determining, by the control processor, whether to select the item for fulfillment of the order; and
based at least on a determination to select the item for fulfillment of the order, controlling, by the control processor, a picking mechanism to divert the selected item to a selection output.

12. The method of claim 11, further comprising:
producing the reflection from the item with a light source.

13. The method of claim 11, further comprising:
contributing additional sensor data to the sensor output by at least one additional sensor, wherein the additional sensor is selected from the list consisting of:
a second hyperspectral sensor positioned at a different viewing angle than the first hyperspectral sensor relative to the item, and an optical camera.

14. The method of claim 11, further comprising:
transporting the item from to the selection component to an order storage zone.

15. The method of claim 14, wherein the order storage zone comprises an automated storage and retrieval system (ASRS).

16. The method of claim 11, further comprising:
identifying a ripeness preference,
wherein selecting the hyperspectral profile comprises selecting the hyperspectral profile based at least on the ripeness preference.

17. The method of claim 11, further comprising:
based at least on a determination to not select the item for fulfillment of the order, diverting the item to a disposal output.

18. The method of claim 11, further comprising:
updating the set of hyperspectral profiles based at least on received feedback or environmental conditions.

19. The method of claim 11, wherein the item comprises a perishable food item.

20. One or more computer storage devices having computer-executable instructions stored thereon, which, on execution by a control processor, cause the control processor to perform operations comprising:
receiving, by an order processor implemented on the control processor, an order identifying an item, wherein the item comprises a perishable food item;

receiving sensor output from a hyperspectral sensor, wherein the sensor output is based at least on a reflection from the item;

based at least on identification of the item, selecting a hyperspectral profile from a set of hyperspectral profiles;

comparing the sensor output with the selected hyperspectral profile;

based at least on whether the sensor output is within the lower threshold and the higher threshold within the selected hyperspectral profile, determining whether to select the item for fulfillment of the order;

based at least on a determination to select the item for fulfillment of the order, controlling a picking mechanism to divert the item to a selection output and controlling a transport vehicle to transport the selected item to an automated storage and retrieval system (ASRS);

based at least on a determination to not select the item for fulfillment of the order, controlling the picking mechanism to divert the item to a disposal output and controlling the transport vehicle to transport the item to a disposal zone; and updating the set of hyperspectral profiles based at least on received feedback or environmental conditions.

* * * * *